Patented July 28, 1931

1,816,394

UNITED STATES PATENT OFFICE

OSKAR ALBERT MÜLLER, OF ZURICH, SWITZERLAND

PROCESS FOR WORKING UP MATERIALS CONTAINING LIGNIN AND CELLULOSE

No Drawing. Application filed February 7, 1930, Serial No. 426,778, and in Germany February 9, 1929.

This invention relates to a process for working up materials which contain both lignin and cellulose.

According to the invention, a cellulose, which can be easily bleached, is made from wood and other vegetable materials, containing both cellulose and lignin, by treating the material, after it has been chlorinated in a moist condition, with an organic solvent which is soluble in water and contains mineral acid, the treatment being preferably conducted at raised temperature. In this manner chloro-lignin is eliminated from the chlorinated product without weakening the cellulose fibre and at the same time adventitious products of the cellulose are dissolved.

If the material to be treated contains bark, the impurities arising therefrom may be separated by an after-treatment of the cellulose with dilute alkali at a raised temperature and if desired under pressure, which as is known is not possible in the case of cellulose of other origin, for example sulphite-cellulose.

The invention has the further advantage that the whole of the lignin contained in the parent material may be recovered from the waste liquors in the form of chloro-lignin; for instance the solvent may be distilled from the extract (whereby the chloro-lignin is obtained in solid form when the solvent has been sufficiently removed), or by diluting the extract with water or by a combination of both methods.

Furthermore, a part of the chloro-lignin may be precipitated by mixing the extract with excess of caustic alkali, and then separating the solvent by distillation from the neutral, acid or alkali liquor and acidifying the residue, if that be necessary, for the purpose of precipitating the rest of the chloro-lignin.

The extract contains in addition to chloro-lignin and other materials substances of tanning action which are preferably recovered after separation of the chloro-lignin, for instance by extracting the residue, which has been freed from chloro-lignin and organic solvent, with a solvent specific for extracting tannin (such as ethyl-acetate) or by mixing the extract with a substance which precipitates tannin, such as a hydroxide of an alkaline earth metal. Finally from the residual liquor, which contains sugar, alcohol may be obtained by fermentation.

*Example*

Pine wood shavings are chlorinated in known manner while in moist condition with chlorine gas; hydrochloric acid is produced which, if desirable, may be separated in part for its recovery. The moist chlorinated material containing hydrochloric acid is now thoroughly extracted with boiling alcohol, preferably on the counter-current principle. When the said principle is adopted, the separation of the chloro-lignin occurs during the treatment with the alcohol, which has been enriched in hydrochloric acid and extractive matter, while the treatment with fresh alcohol completely purifies the cellulose. The latter is obtained in white, long fibred form.

For the purpose of obtaining the chloro-lignin, the alcoholic extract which contains about 60–85 per cent. of alcohol and 0,5–5 per cent. of hydrochloric acid is mixed with water until no further chloro-lignin is precipated. The chloro-lignin is now separated by filtration and responds with a yield of about 22 per cent. of the wood used when calculated as free from chlorine. It contains about 30 per cent. of chlorine and is a light brown mass which is soluble in dilute caustic alkali. A similar product is obtained, if instead of diluting with water, the alcohol is distilled. Another method is to mix the alcoholic extract with an excess of caustic soda lye of 40 per cent. strength and isolate the precipitate thus produced by decantation and wash with alcohol. By distilling the alcohol from the filtrate and acidifying the latter a further quantity of chloro-lignin may be obtained. The chloro-lignin separated in this manner contains a smaller proportion of chlorine.

The filtrate freed from chloro-lignin is now extracted with a suitable organic solvent, such as ethyl-acetate, and the solvent is evaporated from the extract, leaving a solid product containing 45-50 per cent. of constituents of tanning action and therefore applicable as a tanning agent. Instead of extracting the tanning material with ethyl-acetate, it may be precipitated by means of a suitable agent. For example, if the liquor which has been freed from chloro-lignin is treated with barium hydroxide or calcium hydroxide, a highly valuable tanning agent containing up to 80 per cent. of tanning constituents may be obtained. The yield amounts to about 4 per cent. of the wood used.

By fermentation of the residual solution the fermentable constituents may be converted into alcohol.

For freeing the extract from chloro-lignin, the procedures set forth in the second paragraph of the example may be combined, for example the alcohol may be distilled in greater part and then the chloro-lignin may be precipitated from the concentrated extract by means of water.

Other organic solvents soluble in water may be used instead of alcohol, for instance methyl alcohol, acetone, glacial acetic acid, propyl alcohol, phenol or the like. Only the stronger mineral acids are available. Hydrochloric acid which is produced in the chlorination of the moist material is preferable on this account, but sulphuric acid may be used.

I claim:

1. Process of working up materials containing lignin and cellulose which comprises chlorinating the material in moistened condition, treating the chlorinated material with an organic solvent miscible with water and containing a mineral acid, so as to eliminate the chloro-lignin and remove such parts as are soluble in the organic solvent from the cellulose, separating the chloro-lignin from the extract thus obtained, distilling the organic solvent, extracting the tanning agents, and fermenting the aqueous residue.

2. Process of working up materials containing lignin and cellulose which comprises chlorinating the material in moistened condition, treating the chlorinated material with an organic solvent miscible with water and containing a mineral acid, so as to eliminate the chloro-lignin and remove such parts as are soluble in the organic solvent from the cellulose, treating the cellulose with a dilute caustic alkali at a raised temperature for the purpose of removing the impurities which are derived from the bark constituents in the parent material, separating the chloro-lignin from the organic solvent extract thus obtained, distilling the organic solvent, extracting the tanning agents, and fermenting the aqueous residue.

3. Process of working up materials containing lignin and cellulose which comprises chlorinating the material in moistened condition, treating the chlorinated material with an organic solvent miscible with water and containing a mineral acid, so as to eliminate the chloro-lignin and remove such parts as are soluble in the organic solvent from the cellulose, separating the chloro-lignin from the extract thus obtained by distilling the organic solvent, extracting the tanning agents, and fermenting the aqueous residue.

4. Process of working up materials containing lignin and cellulose which comprises chlorinating the material in moistened condition, treating the chlorinated material with an organic solvent miscible with water and containing a mineral acid, so as to eliminate the chloro-lignin and remove such parts as are soluble in the organic solvent from the cellulose, separating the chloro-lignin from the extract thus obtained by diluting the latter with water, distilling the organic solvent, extracting the tanning agents, and fermenting the aqueous residue.

5. Process of working up materials containing lignin and cellulose which comprises chlorinating the material in moistened condition, treating the chlorinated material with an organic solvent miscible with water and containing a mineral acid, so as to eliminate the chloro-lignin and remove such parts as are soluble in the organic solvent from the cellulose, mixing the extract thus obtained with caustic alkali, filtering, distilling the solvent from the filtrate, acidifying the residue, again filtering for fractionally precipitating the chloro-lignin from the extract, extracting the tanning agents, and fermenting the aqueous residue.

6. Process of working up materials containing lignin and cellulose which comprises chlorinating the material in moistened condition, treating the chlorinated material with an organic solvent miscible with water and containing a mineral acid, so as to eliminate the chloro-lignin and remove such parts as are soluble in the organic solvent from the cellulose, separating the chloro-lignin from the extract thus obtained, separating the organic solvent, adding a suitable organic liquid for separating the tanning agents by extraction, and fermenting the aqueous residue.

7. Process of working up materials containing lignin and cellulose which comprises chlorinating the material in moistened condition, treating the chlorinated material with an organic solvent miscible with water and containing a mineral acid, so as to eliminate the chloro-lignin and remove such parts as are soluble in the organic solvent from the cellulose, separating the chloro-lignin from the extract thus obtained, separating the organic solvent, adding a hydroxide of an alkaline earth metal for precipitating the tanning agents, and fermenting the aqueous residue.

8. Process of working up materials containing lignin and cellulose which comprises chlorinating the material in moistened condition, treating the chlorinated material with ethylalcohol, containing hydrochloric acid, so as to eliminate the chloro-lignin and remove such parts as are soluble in the ethylalcohol, and hydrochloric acid, from the cellulose, partly distilling the alcohol from the extract thus obtained, adding water so as to separate the chloro-lignin, separating the chloro-lignin by filtration, distilling the alcohol still present from the chloro ligninfiltrate, adding hydroxides of the earth alkali metals for extracting the tanning agents, converting the fermentable constituents of the filtrate freed of the tanning agents into ethylalcohol by fermentation, and separating the ethylalcohol by distillation.

In testimony whereof I have signed my name to this specification.

OSKAR ALBERT MÜLLER.